(12) United States Patent
Kumagai et al.

(10) Patent No.: US 10,882,329 B2
(45) Date of Patent: Jan. 5, 2021

(54) THERMAL HEAD AND THERMAL PRINTER

(71) Applicant: KYOCERA Corporation, Kyoto (JP)

(72) Inventors: Akira Kumagai, Fukuyama (JP); Hironari Abe, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/498,066

(22) PCT Filed: Mar. 23, 2018

(86) PCT No.: PCT/JP2018/011787
§ 371 (c)(1),
(2) Date: Sep. 26, 2019

(87) PCT Pub. No.: WO2018/181025
PCT Pub. Date: Oct. 4, 2018

(65) Prior Publication Data
US 2020/0101761 A1    Apr. 2, 2020

(30) Foreign Application Priority Data

Mar. 29, 2017  (JP) ................................. 2017-065424
Oct. 27, 2017  (JP) ................................. 2017-208288

(51) Int. Cl.
*B41J 2/335*       (2006.01)
*G01N 23/20008*    (2018.01)

(52) U.S. Cl.
CPC ......... *B41J 2/3353* (2013.01); *B41J 2/33505* (2013.01); *B41J 2/3351* (2013.01); *G01N 23/20008* (2013.01)

(58) Field of Classification Search
CPC ...... B41J 2/3353; B41J 2/33505; B41J 2/335; B41J 2/3351; G01N 23/20008
See application file for complete search history.

(56) References Cited

U.S. PATENT DOCUMENTS

| | | | |
|---|---|---|---|
| 5,374,946 A | 12/1994 | Shirakawa | |
| 8,189,022 B2* | 5/2012 | Koroishi | B41J 2/33585 347/206 |
| 9,511,585 B2* | 12/2016 | Abbott, Jr. | B41J 2/14112 |
| 2002/0168552 A1 | 11/2002 | Yamamoto et al. | |
| 2004/0237840 A1 | 12/2004 | Yamamoto et al. | |
| 2005/0186448 A1 | 8/2005 | Yamamoto et al. | |
| 2012/0043617 A1 | 2/2012 | Nakagawa et al. | |

(Continued)

FOREIGN PATENT DOCUMENTS

| | | |
|---|---|---|
| JP | 62-003738 U | 1/1987 |
| JP | 11-124665 A | 5/1999 |

(Continued)

*Primary Examiner* — Henok D Legesse
(74) *Attorney, Agent, or Firm* — Volpe Koenig

(57) ABSTRACT

A thermal head X1 according to the present disclosure includes a substrate, a heat generator, an electrode, and a protective layer. The heat generator is positioned on the substrate. The electrode is positioned on the substrate and connected to the heat generator. The protective layer covers the heat generator and part of the electrode. The protective layer contains titanium and nitrogen. The protective layer satisfies P2>P1 where P1 is the peak intensity of X-ray diffraction of the (111) plane, and P2 is the peak intensity of X-ray diffraction of the (200) plane.

14 Claims, 6 Drawing Sheets

(56) References Cited

U.S. PATENT DOCUMENTS

2017/0266733 A1  9/2017  Sato et al.
2018/0071830 A1  3/2018  Sato et al.
2019/0061371 A1  2/2019  Ishii

FOREIGN PATENT DOCUMENTS

| | | |
|---|---|---|
| JP | 2006-231523 A | 9/2006 |
| JP | 2009-032855 A | 2/2009 |
| JP | 2009-126117 A | 6/2009 |
| JP | 2010-095800 A | 4/2010 |
| JP | 2010-149515 A | 7/2010 |
| JP | 2016-107396 A | 6/2016 |
| WO | 2010/125810 A1 | 11/2010 |
| WO | 2016/084939 A1 | 6/2016 |
| WO | 2016/148056 A1 | 9/2016 |
| WO | 2017/073681 A1 | 5/2017 |

* cited by examiner

THERMAL HEAD AND THERMAL PRINTER

CROSS-REFERENCE TO RELATED APPLICATIONS

This application is national stage application of International Application No. PCT/JP2018/011787, filed on Mar. 23, 2018, which designates the United States, incorporated herein by reference, and which claims the benefit of priority from Japanese Patent Application No. 2017-065424, filed on Mar. 29, 2017; and Japanese Patent Application No. 2017-208288, filed on Oct. 27, 2017, the entire contents of both of which are incorporated herein by reference.

FIELD

The present disclosure relates to a thermal head and a thermal printer.

BACKGROUND

Conventionally, various thermal heads have been developed as printing devices for facsimiles or video printers, for example. There has been developed a thermal head including a substrate, a heat generator, electrodes, and a protective layer, for example (refer to Patent Literature 1). The heat generator is positioned on the substrate. The electrodes are positioned on the substrate and connected to the heat generator. The protective layer covers the heat generator and part of the electrodes and contains titanium and nitrogen.

CITATION LIST

Patent Literature

Patent Literature 1: Japanese Utility Model Application Laid-open No. S62-3738

SUMMARY

A thermal head according to the present disclosure includes a substrate, a heat generator, an electrode, and a protective layer. The heat generator is positioned on the substrate. The electrode is positioned on the substrate and connected to the heat generator. The protective layer covers the heat generator and part of the electrode. The protective layer contains titanium and nitrogen. The protective layer satisfies $P2>P1$ where $P1$ is the peak intensity of X-ray diffraction of the (111) plane, and $P2$ is the peak intensity of X-ray diffraction of the (200) plane.

A thermal printer according to the present disclosure includes the thermal head, a conveyance mechanism and a platen roller. The conveyance mechanism coveys a recording medium such that the recording medium passes over the heat generator, and the platen roller presses the recording medium against the heat generator.

DESCRIPTION OF EMBODIMENTS

To increase the abrasion resistance, the protective layer of the conventional thermal head contains titanium and nitrogen. The protective layers containing titanium and nitrogen are manufactured with high productivity because they have high hardness and can be formed into a thin layer. The protective layers have recently been required to have higher abrasion resistance.

A thermal head according to the present disclosure includes a protective layer having higher abrasion resistance and can run a longer running distance on a recording medium. The thermal head according to the present disclosure and a thermal printer provided with the thermal head are described below in greater detail.

First Embodiment

Figure 1:
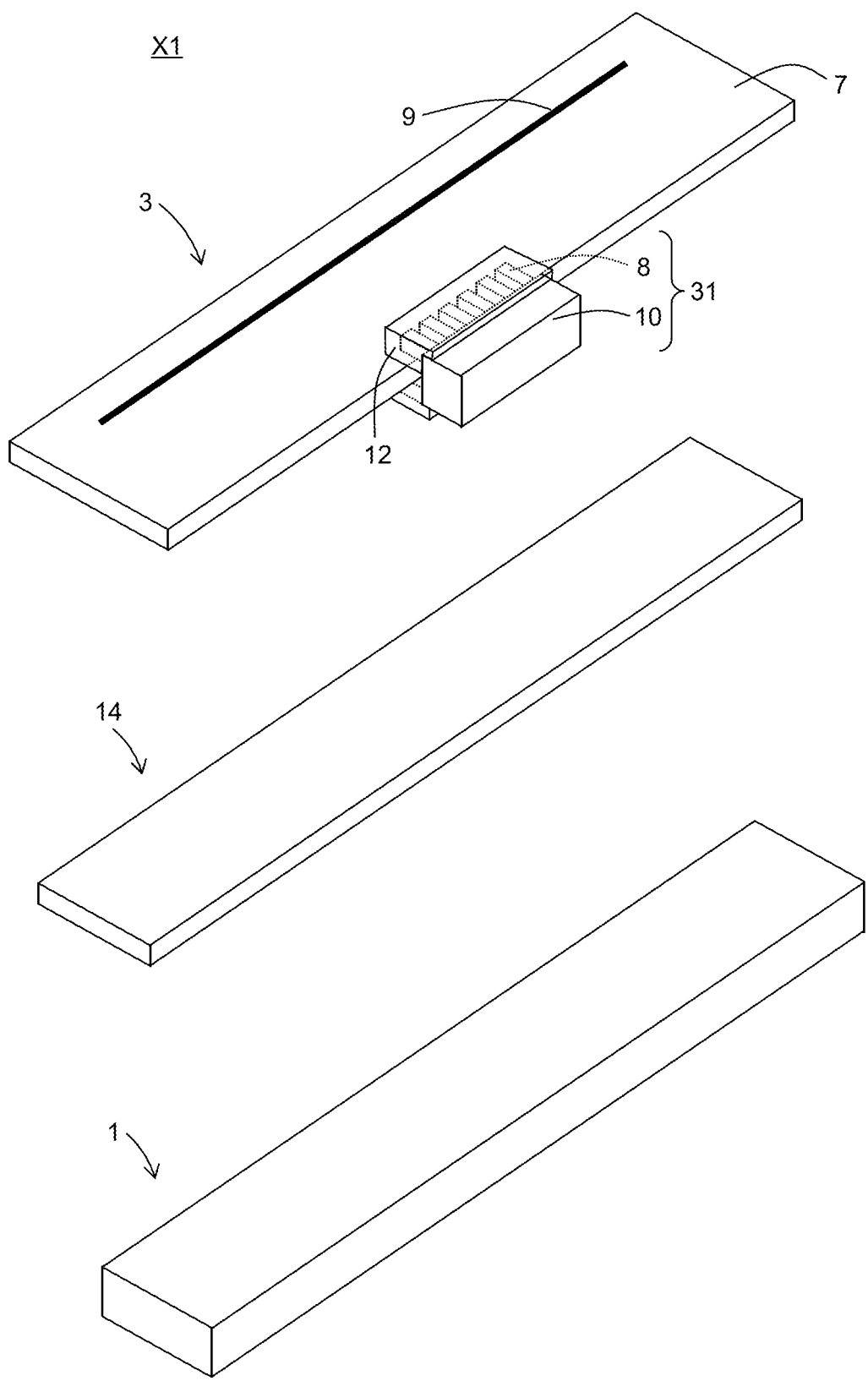
FIG. 1 is an exploded perspective view schematically illustrating a thermal head according to a first embodiment.
Figure 2:
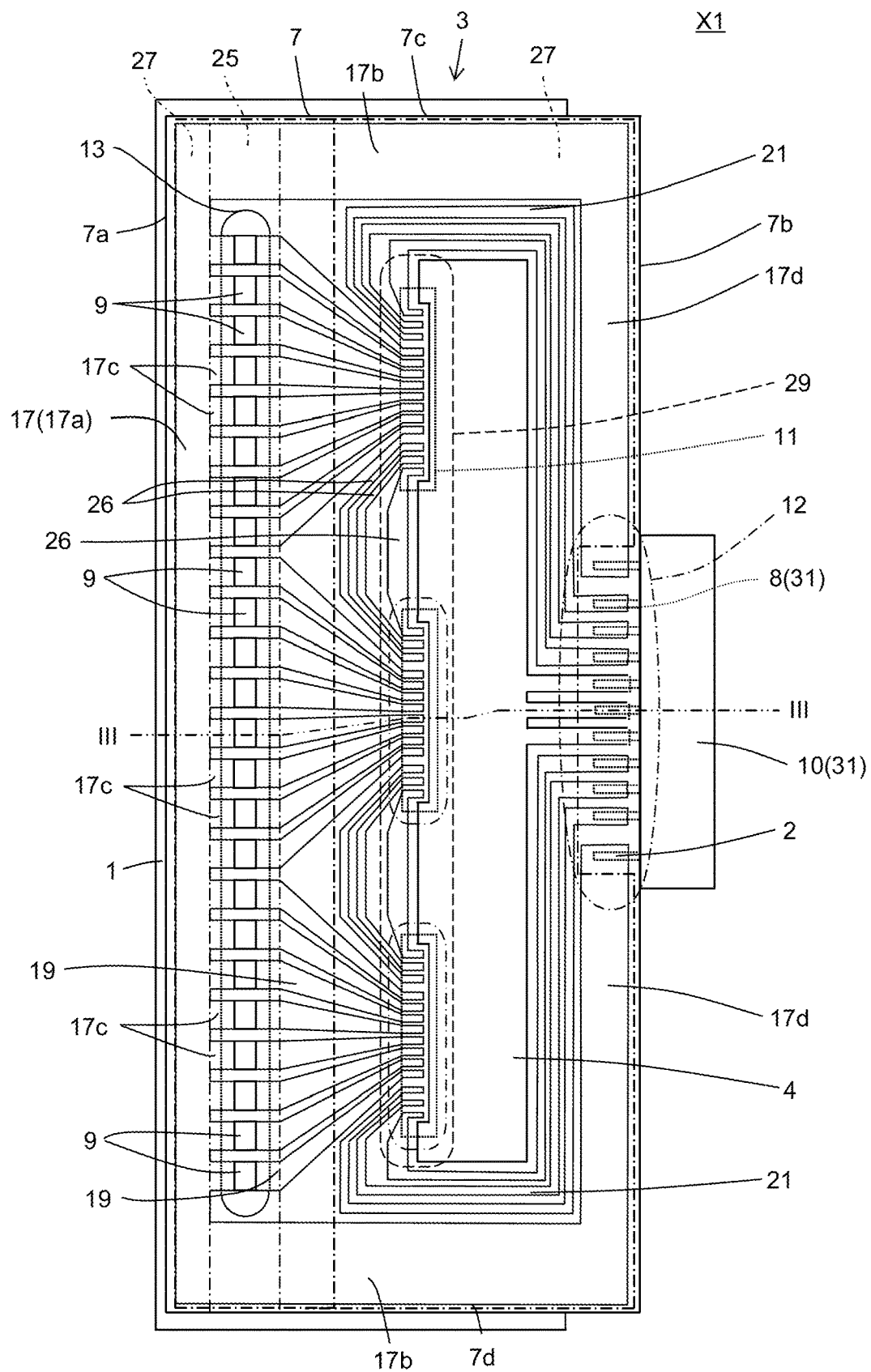
FIG. 2 is a plan view schematically illustrating the thermal head illustrated in FIG. 1.
Figure 3:
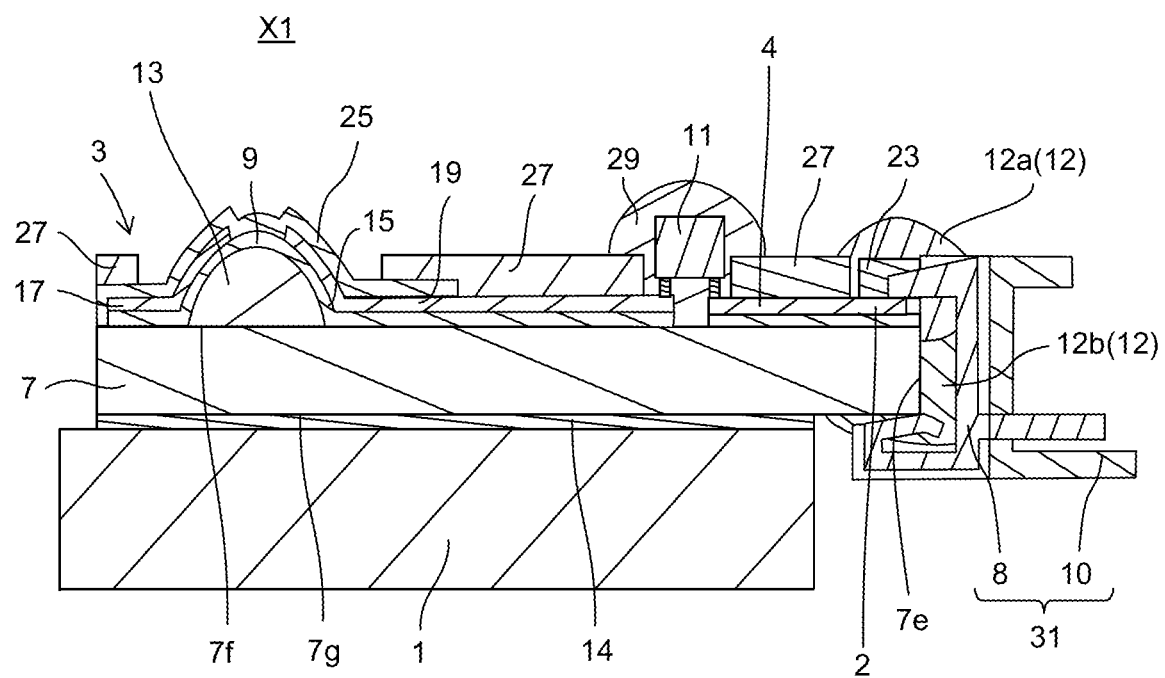
FIG. 3 is a sectional view along line III-III of FIG. 2.
Figure 4:
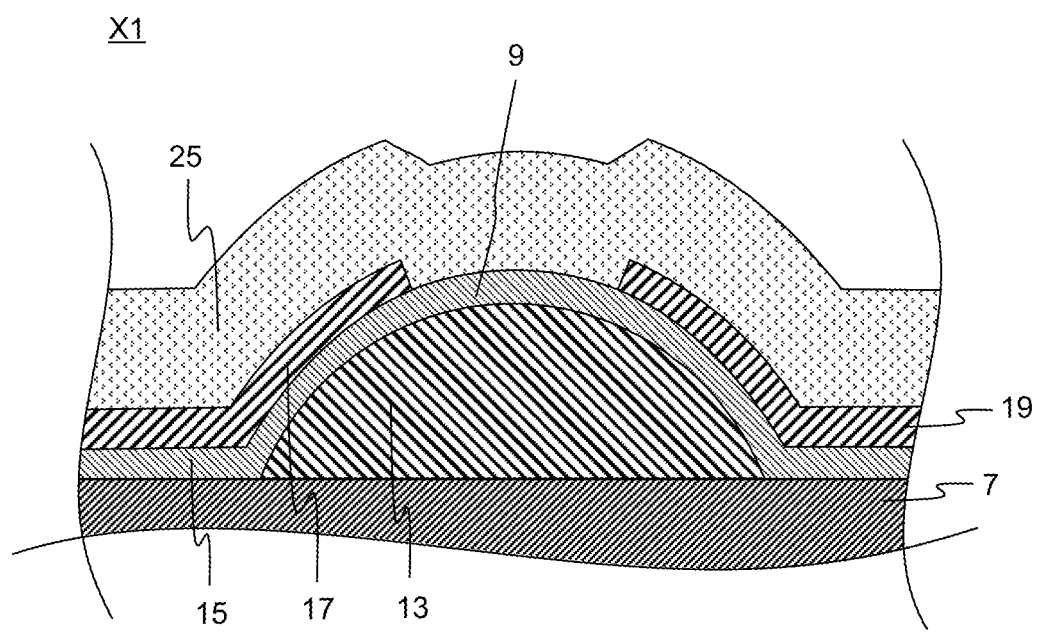
FIG. 4 is an enlarged sectional view of a part near a protective layer of the thermal head illustrated in FIG. 1.

A thermal head X1 is described below with reference to FIGS. 1 to 4. FIG. 1 schematically illustrates the configuration of the thermal head X1. In FIG. 2, a protective layer 25, a covering layer 27, and a sealing member 12 are indicated by alternate long and short dash lines, and a covering member 29 is indicated by a dashed line. FIG. 3 is a sectional view along line III-III of FIG. 2. FIG. 4 illustrates a part near the protective layer 25 of the thermal head X1 in an enlarged manner.

The thermal head X1 includes a head base 3, a connector 31, the sealing member 12, a heat radiation plate 1, and an adhesive member 14. The connector 31, the sealing member 12, the heat radiation plate 1, and the adhesive member 14 are not necessarily provided.

The heat radiation plate 1 radiates surplus heat of the head base 3. The head base 3 is placed on the heat radiation plate 1 with the adhesive member 14 interposed therebetween. The head base 3 is supplied with a voltage from the outside, thereby printing an image on a recording medium P (refer to FIG. 5). The adhesive member 14 bonds the head base 3 to the heat radiation plate 1. The connector 31 electrically connects the head base 3 to the outside. The connector 31 includes connector pins 8 and a housing 10. The sealing member 12 joins the connector 31 and the head base 3.

The heat radiation plate 1 has a rectangular parallelepiped shape. The heat radiation plate 1 is made of a metal material, such as copper, iron, or aluminum. The heat radiation plate 1 has a function of radiating heat not used for printing in the heat generated by heat generators 9 of the head base 3.

The head base 3 has a rectangular shape in planar view and is provided with members constituting the thermal head X1 on a substrate 7. The head base 3 has a function of printing characters on the recording medium P based on electrical signals supplied from the outside.

The following describes the members constituting the head base 3, the sealing member 12, the adhesive member 14, and the connector 31 with reference to FIGS. 1 to 3.

The head base 3 includes the substrate 7, a heat storage layer 13, an electrical resistant layer 15, a common electrode 17, individual electrodes 19, first connection electrodes 21, connection terminals 2, a conductive member 23, drive integrated circuits (ICs) 11, the covering member 29, the protective layer 25, and the covering layer 27. All these members are not necessarily provided. The head base 3 may include other members besides these members.

The substrate 7 is disposed on the heat radiation plate 1 and has a rectangular shape in planar view. The substrate 7 has a first surface 7f, a second surface 7g, and a side surface 7e. The first surface 7f has a first long side 7a, a second long side 7b, a first short side 7c, and a second short side 7d. The members constituting the head base 3 are disposed on the first surface 7f. The second surface 7g is positioned opposite to the first surface 7f. The second surface 7g is positioned on the heat radiation plate 1 side and bonded to the heat radiation plate 1 with the adhesive member 14 interposed therebetween. The side surface 7e connects the first surface 7f and the second surface 7g and is positioned on the second long side 7b.

The substrate 7 is made of an electrical insulating material, such as alumina ceramic, or a semiconductor material, such as single crystal silicon.

The heat storage layer 13 is positioned on the first surface 7f of the substrate 7. The heat storage layer 13 rises upward from the first surface 7f. In other words, the heat storage layer 13 protrudes in a direction away from the first surface 7f of the substrate 7.

The heat storage layer 13 is disposed side by side with the first long side 7a of the substrate 7 and extends in a main scanning direction. The section of the heat storage layer has a substantially semi-elliptical shape. This shape enables the protective layer 25 formed on the heat generators 9 to reliably come into contact with the recording medium P on which an image is to be printed. The height of the heat storage layer 13 from the first surface 7f of the substrate 7 may be 30 to 60 µm.

The heat storage layer 13 is made of glass having low thermal conductivity and temporarily accumulates part of the heat generated by the heat generators 9. This structure can reduce the time required to raise the temperature of the heat generators 9, thereby enhancing the thermal responsiveness of the thermal head X1.

The heat storage layer 13 is produced by: mixing an appropriate organic solvent with glass powder to obtain predetermined glass paste, applying the glass paste to the first surface 7f of the substrate 7 by screen printing, and firing the glass paste, for example.

The electrical resistant layer 15 is positioned on the upper surface of the heat storage layer 13. The common electrode 17, the individual electrodes 19, the first connection electrodes 21, and second connection electrodes 26 are formed on the electrical resistant layer 15. An exposure region in which the electrical resistant layer 15 is exposed is formed between the common electrode 17 and each of the individual electrodes 19. As illustrated in FIG. 2, the exposure regions of the electrical resistant layer 15 are disposed in a row on the heat storage layer 13 and each serve as the heat generator 9.

The electrical resistant layer 15 is not necessarily positioned between the various electrodes and the heat storage layer 13. The electrical resistant layer 15, for example, may be positioned only between the common electrode 17 and the individual electrodes 19 so as to electrically connect the common electrode 17 and the individual electrodes 19.

While the heat generators 9 are schematically illustrated in FIG. 2 for convenience of explanation, they are disposed at a density of 100 dot per inch (dpi) to 2400 dpi, for example. The electrical resistant layer 15 is made of a material having relatively high electrical resistance, such as a TaN-, TaSiO-, TaSiNO-, TiSiO-, TiSiCO-, or NbSiO-based material. When a voltage is applied to the heat generators 9, the heat generators 9 generate heat by Joule heating.

The common electrode 17 includes main wiring portions 17a and 17d, sub-wiring portions 17b, and leading portions 17c. The common electrode 17 electrically connects the heat generators 9 to the connector 31. The main wiring portion 17a extends along the first long side 7a of the substrate 7. The sub-wiring portions 17b extend along the first short side 7c and the second short side 7d of the substrate 7. The leading portions 17c extend individually toward the respective heat generators 9 from the main wiring portion 17a. The main wiring portion 17d extends along the second long side 7b of the substrate 7.

The individual electrodes 19 electrically connect the respective heat generators 9 to the drive IC 11. The heat generators 9 are divided into a plurality of groups. The heat generators 9 in a group are electrically connected to the drive IC 11 disposed corresponding to the group by the respective individual electrodes 19.

The first connection electrodes 21 electrically connect the drive ICs 11 to the connector 31. The first connection electrodes 21 connected to the drive ICs 11 are a plurality of wires having different functions.

The second connection electrodes 26 electrically connect the drive ICs 11 disposed side by side. The second connection electrodes 26 are a plurality of wires having different functions.

The common electrode 17, the individual electrodes 19, the first connection electrodes 21, and the second connection electrodes 26 are made of a conductive material, that is, a kind of metal out of aluminum, gold, silver, and copper, or an alloy of these metals, for example.

The connection terminals 2 are disposed on the second long side 7b of the first surface 7f so as to connect the common electrode 17 and the first connection electrodes 21 to an FPC 5. The connection terminals 2 are disposed corresponding to the respective connector pins 8 of the connector 31, which will be described later.

The conductive member 23 is provided on the connection terminals 2. Examples of the conductive member 23 include, but are not limited to, solder, anisotropic conductive paste (ACP), etc. A Ni-, Au-, or Pd-plated layer may be disposed between the conductive member 23 and the connection terminals 2.

The various electrodes constituting the head base 3 are formed by: sequentially laminating material layers made of metal, such as Al, Au, or Ni on the heat storage layer 13 by a thin-film formation technique, such as sputtering, and processing the obtained multilayered structure into a predetermined pattern by photo-etching, for example. The various electrodes constituting the head base 3 can be formed simultaneously by the same process.

As illustrated in FIG. 2, the drive ICs 11 are disposed corresponding to the respective groups of the heat generators 9. The drive ICs 11 are connected to the individual electrodes 19 and the first connection electrodes 21. The drive ICs 11 have a function of controlling the energized state of the heat generators 9. The drive ICs 11 are provided as switching ICs.

The protective layer 25 covers the heat generators 9, the common electrode 17, and part of the individual electrodes 19. The protective layer 25 protects the covered region against corrosion due to adhesion of water or the like included in the air or abrasion due to contact of the recording medium P on which an image is to be printed.

The covering layer 27 is disposed on the substrate 7 so as to partially cover the common electrode 17, the individual electrodes 19, the first connection electrodes 21, and the second connection electrodes 26. The covering layer 27 protects the covered region against oxidation due to contact with the air or corrosion due to adhesion of water or the like included in the air. The covering layer 27 is made of a resin material, such as epoxy resin, polyimide resin, or silicone resin.

The drive ICs 11 are sealed with the covering member 29 made of resin, such as epoxy resin or silicone resin, in such a manner as to be connected to the individual electrodes 19, the first connection electrodes 21, and the second connection electrodes 26. The covering member 29 extends in the main scanning direction and integrally seals the drive ICs 11.

The connector 31 includes the connector pins 8 and the housing 10 that accommodates the connecter pins 8. The connector pins 8 each have a first end and a second end. The first end is exposed to the outside of the housing 10. The second end is accommodated in the housing 10 and extracted to the outside. The first end of the connector pin 8 is electrically connected to the connection terminal 2 of the head base 3. With this configuration, the connector 31 is electrically connected to the various electrodes of the head base 3.

The sealing member 12 includes a first sealing member 12a and a second sealing member 12b. The first sealing member 12a is positioned on the first surface 7f of the substrate 7. The first sealing member 12a seals the connector pins 8 and the various electrodes. The second sealing member 12b is positioned on the second surface 7g of the substrate 7. The second sealing member 12b is disposed so as to seal the contact part of the connector pins 8 and the substrate 7.

The sealing member 12 is disposed so as to prevent the connection terminals 2 and the first ends of the connector pins 8 from being exposed to the outside. The sealing member 12 is made of thermosetting epoxy resin, ultraviolet curing resin, or visual-light curing resin, for example. The first sealing member 12a and the second sealing member 12b may be made of the same material. Alternatively, the first sealing member 12a and the second sealing member 12b may be made of different materials.

The adhesive member 14 is disposed on the heat radiation plate 1 and bonds the second surface 7g of the head base 3 to the heat radiation plate 1. Examples of the adhesive member 14 include, but are not limited to, a double-sided adhesive tape, a resin adhesive, etc.

The following describes the protective layer 25 in greater detail with reference to FIG. 4.

The protective layer 25 contains titanium (Ti) and nitrogen (N). Examples of the material of the protective layer include, but are not limited to, TiN, TiON, TiCrN, TiAlON, etc. If TiN is used for the protective layer 25, the protective layer 25 can contain Ti of 40 to 60 at % and N of 40 to 60 at %, for example.

The thickness of the protective layer 25 can be set to 5 to 20 μm. By setting the thickness of the protective layer 25 to 5 μm or larger, the running distance of the thermal head X1 on the recording medium P can be increased. By setting the thickness of the protective layer 25 to 20 μm or smaller, the heat of the heat generators 9 can be easily transmitted to the recording medium P, thereby improving the thermal efficiency of the thermal head X1.

When the peak intensity of X-ray diffraction of the (111) plane is P1 (hereinafter, referred to as P1), and the peak intensity of X-ray diffraction of the (200) plane is P2 (hereinafter, referred to as P2), the protective layer 25 has a relation of P2>P1. In other words, crystal grains constituting the protective layer 25 have the peak intensity of the (200) plane higher than that of the (111) plane and are oriented along the a-axis.

On the crystal planes of the crystal grains constituting the protective layer 25, the number of (200) planes having smaller surface energy is larger than that of (111) planes. This structure makes the protective layer 25 finer, thereby increasing the abrasion resistance of the protective layer 25.

The protective layer 25 has the (200) planes and the (111) planes, and the number of (200) planes is larger than that of (111) planes. With this structure, the (200) planes can make the protective layer 25 finer, and the (111) planes can reduce strain energy generated on the protective layer 25. As a result, internal stress of the protective layer 25 is reduced, thereby making a crack less likely to be generated.

Alternatively, $1<P2/P1\leq4.74$ may be satisfied. With this structure, the thermal head X1 can have a higher ratio of the (200) planes to the (111) planes. By causing the (200) planes to dominate, the protective layer 25 can be made finer. The (111) plane serves as a slip plane of the crystal. With the (111) planes, the protective layer 25 can have higher slipperiness, thereby making sticking less likely to occur in the thermal head X1.

In the protective layer 25, the half width of the diffraction peak of the (200) plane measured by X-ray diffraction may be 0.5° to 1°. With this structure, the grain size of the crystals constituting the (200) plane increases, thereby reducing the contact area between the recording medium P and the protective layer 25. As a result, dynamic frictional force received from the recording medium P can be reduced, thereby increasing the abrasion resistance of the protective layer 25.

In the protective layer 25, the half width of the diffraction peak of the (111) plane measured by X-ray diffraction may be 0.8° to 1.2°. With this structure, the grain size of the crystals constituting the (111) plane increases, thereby reducing the contact area between the recording medium P and the protective layer 25. As a result, dynamic frictional force received from the recording medium P can be reduced, thereby increasing the abrasion resistance of the protective layer 25.

The peak intensity of the crystal plane can be checked by the following method. First of all, the thermal head X1 is cut in the thickness direction of the substrate 7 along a sub-scanning direction to form a cross section of the protective layer 25. The peak intensity detected in a range of 2 θ: 20° to 80° in the diffraction pattern obtained by an X-ray diffraction analysis on the cross section is defined as the peak intensity of the crystal plane. The half width is measured using the diffraction pattern obtained by the X-ray diffraction analysis.

The hardness of the protective layer 25 may be 24 GPa or higher. With this structure, abrasion due to contact with the recording medium P is less likely to occur, thereby increasing the abrasion resistance of the thermal head X1. The hardness of the protective layer 25 may be 30 GPa or lower. This structure can reduce the possibility that the membrane stress of the protective layer 25 becomes so high as to generate a crack.

The Young's modulus of the protective layer 25 may be 320 GPa or higher. With this structure, the protective layer 25 is less likely to be damaged by a strain generated in the protective layer 25 due to contact with the recording medium P. The Young's modulus of the protective layer 25 may be 400 GPa or lower. This structure can reduce the possibility that the membrane stress of the protective layer 25 becomes so high as to generate a crack.

The hardness and the Young's modulus are measured by the nanoindentation technique.

The arithmetic surface roughness Ra of the protective layer 25 may be 67.7 nm or lower. With this structure, the contact area between the protective layer 25 and the recording medium P can be reduced, thereby reducing the frictional force generated between the protective layer 25 and the recording medium P. As a result, the abrasion resistance of the protective layer 25 can be increased.

The arithmetic surface roughness Ra of the surface of the protective layer 25 may be 32.3 nm or lower. With this structure, the abrasion resistance of the protective layer 25 can be further increased.

The arithmetic surface roughness Ra is measured using an atomic force microscope (AFM).

The crystal grains constituting the protective layer 25 may include columnar grains that are long in the thickness direction of the substrate 7. In other words, the crystal grains constituting the protective layer 25 are long in the thickness direction of the protective layer 25. With this structure, the heat generated by the heat generators 9 can be transmitted efficiently in the thickness direction of the protective layer 25. As a result, the recording medium P can be heated efficiently, thereby improving the thermal efficiency of the thermal head X1.

The structure of the crystals constituting the protective layer 25 can be observed by observing the cross section described above using a transmission electron microscope (TEM). By processing an image taken by the TEM, the length of the crystal grains in the thickness direction of the substrate 7 and the length thereof in a direction orthogonal to the thickness direction of the substrate 7 can be measured. The columnar grains that are long in the thickness direction of the substrate 7 include crystal grains inclining by an angle of 90°±20° with respect to the principal surface of the substrate 7.

The average crystal gain size of the crystal grains constituting the protective layer 25 may be 205 nm to 605 nm. With this structure, crystal grains having a relatively large grain size are positioned on the surface of the protective layer 25. As a result, the contact area between the grain boundary and the recording medium P per unit area decreases, thereby reducing the frictional force generated on the protective layer 25. Consequently, the abrasion resistance of the protective layer 25 is increased.

The standard deviation of the average crystal gain size may be 16.7 nm to 60.8 nm. With this structure, the grain size of the crystal grains constituting the protective layer 25 varies widely. As a result, the protective layer 25 includes the crystal grains having a variety of grain sizes and can have higher abrasion resistance. In other words, the protective layer 25 can support the recording medium P with the crystal grains having different grain sizes, thereby efficiently dispersing the stress received from the recording medium P.

The average crystal grain size of the crystal grains can be checked by the following method, for example. First of all, the surface of the protective layer 25 is photographed using a scanning electron microscope (SEM). Subsequently, the crystal grains are marked on the photograph of the surface and subjected to an image analysis, thereby measuring grain size data on the crystal grains. In the present specification, the average crystal grain size means a median size (d50). The standard deviation of the average crystal gain size may be calculated based on the grain size data on the crystal grains.

The protective layer 25 may be formed by arc plasma ion plating or hollow cathode ion plating.

P1 and P2 may be controlled by the following method, for example. Let us assume a case where the protective layer 25 is formed by arc plasma ion plating, for example. In this case, the protective layer 25 that satisfies P2>P1 may be formed by increasing the absolute value of a substrate bias voltage applied in deposition. Alternatively, the protective layer 25 that satisfies P2>P1 may be formed by lowering the deposition pressure of a deposition device. Still alternatively, the protective layer 25 that satisfies P2>P1 may be formed by raising the temperature of the substrate in deposition.

Figure 5:
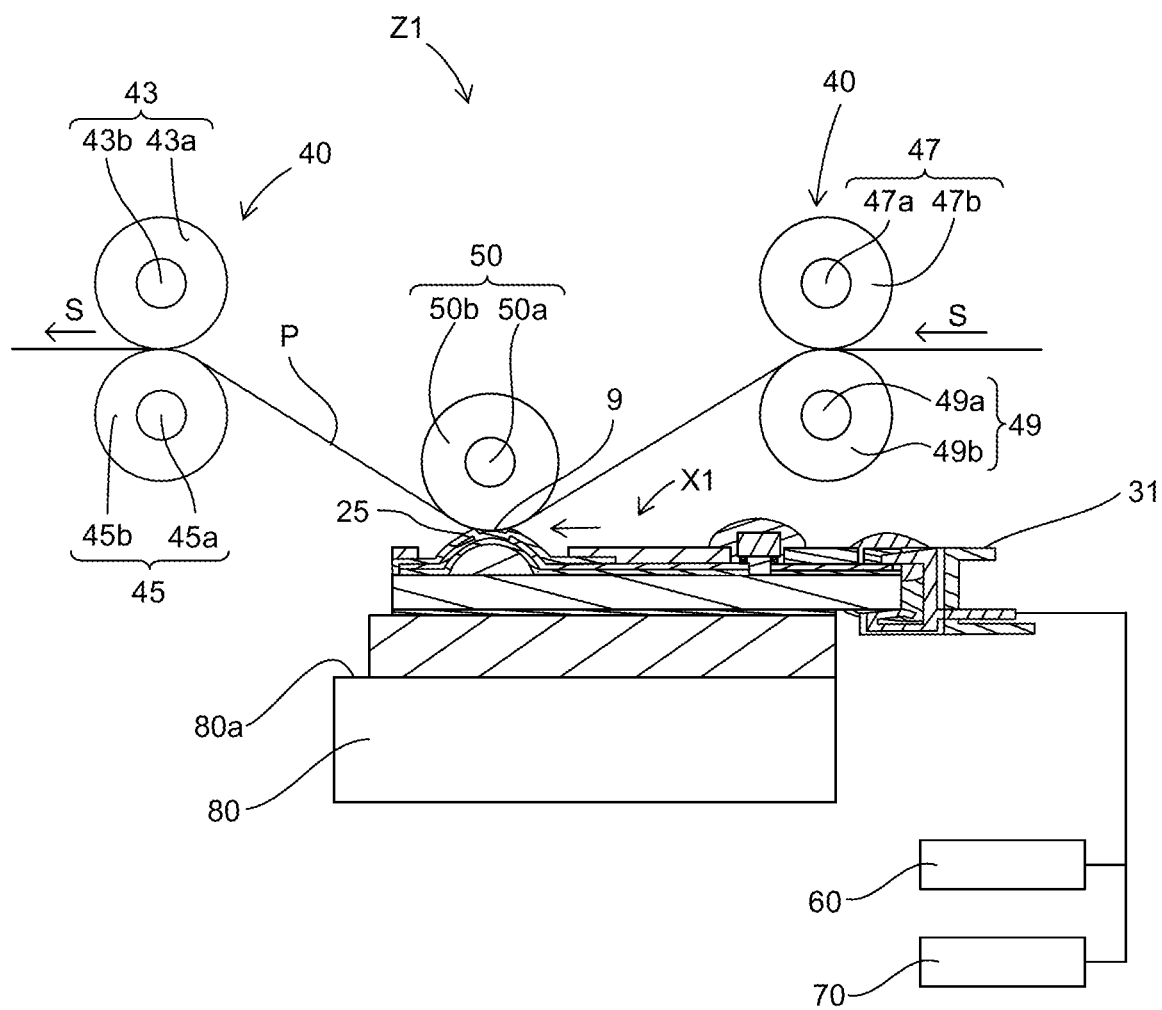
FIG. 5 is a schematic of a thermal printer according to the first embodiment.

The following describes a thermal printer Z1 including the thermal head X1 with reference to FIG. 5.

The thermal printer Z1 according to the present embodiment includes the thermal head X1, a conveyance mechanism 40, a platen roller 50, a power supply device 60, and a control device 70. The thermal head X1 is attached to an attachment surface 80a of an attachment member 80 disposed on a housing (not illustrated) of the thermal printer Z1. The thermal head X1 is attached to the attachment member 80 in such a manner as to extend along the main scanning direction orthogonal to a conveyance direction S.

The conveyance mechanism 40 includes a driver (not illustrated) and conveyance rollers 43, 45, 47, and 49. The conveyance mechanism 40 conveys the recording medium P, such as thermal paper and receiver paper to which ink is transferred, in the arrow S direction illustrated in FIG. 5. The conveyance mechanism 40 conveys the recording medium P onto the protective layer 25 positioned on the heat generators 9 of the thermal head X1. The driver has a function of driving the conveyance rollers 43, 45, 47, and 49 and is provided as a motor, for example. The conveyance rollers 43, 45, 47, and 49 include columnar shafts 43a, 45a, 47a, and 49a and elastic members 43b, 45b, 47b, and 49b covering the shafts 43a, 45a, 47a, and 49a, respectively. The shafts 43a, 45a, 47a, and 49a are made of metal, such as stainless steel, and the elastic members 43b, 45b, 47b, and 49b are made of butadiene rubber, for example. If the recording medium P is receiver paper to which ink is transferred, for example, the conveyance mechanism 40 conveys an ink film (not illustrated) together with the recording medium P between the recording medium P and the heat generators 9 of the thermal head X1.

The platen roller 50 has a function of pressing the recording medium P onto the protective layer 25 positioned on the heat generators 9 of the thermal head X1. The platen roller 50 is disposed extending along the direction orthogonal to the conveyance direction S. Both ends of the platen roller 50 are supported and fixed such that the platen roller 50 can rotate with the recording medium P pressed onto the heat generators 9. The platen roller 50 includes a columnar shaft 50a and an elastic member 50b covering the shaft 50a. The shaft 50a is made of metal, such as stainless steel, and the elastic member 50b is made of butadiene rubber, for example.

The power supply device 60 has a function of supplying an electric current for causing the heat generators 9 of the thermal head X1 to generate heat and an electric current for causing the drive ICs 11 to operate. The control device 70 has a function of supplying control signals for controlling operations of the drive ICs 11 to the drive ICs 11 so as to selectively cause the heat generators 9 of the thermal head X1 to generate heat.

The thermal printer Z1 prints a predetermined image on the recording medium P as follows: the platen roller 50 presses the recording medium P onto the heat generators 9 of the thermal head X1, the conveyance mechanism 40 conveys the recording medium P onto the heat generators 9, and the power supply device 60 and the control device 70 selectively cause the heat generators 9 to generate heat. If the recording medium P is receiver paper, for example, the thermal printer Z1 prints an image on the recording medium P by thermally transferring, to the recording medium P, the ink on the ink film (not illustrated) conveyed together with the recording medium P.

Second Embodiment

Figure 6:
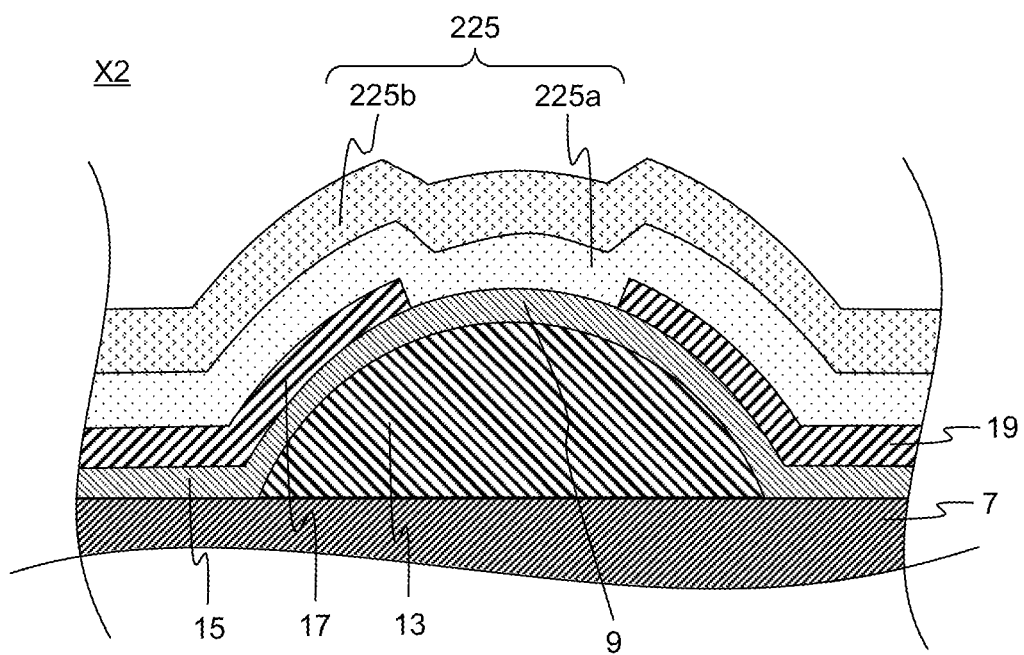
FIG. 6 is an enlarged sectional view of a part near the protective layer of the thermal head according to a second embodiment.

The following describes a thermal head X2 according to a second embodiment with reference to FIG. 6. The thermal head X2 is different from the thermal head X1 in the structure of a protective layer 225. The same members as those of the thermal head X1 are denoted by like reference numerals, and explanation thereof is omitted.

The protective layer 225 includes a first layer 225a and a second layer 225b. The first layer 225a is positioned on the substrate 7. The second layer 225b is positioned on the first layer 225a. The first layer 225a and the second layer 225b contain titanium (Ti) and nitrogen (N). Examples of the material of the first layer 225a and the second layer 225b include, but are not limited to, TiN, TiON, TiCrN, TiAlON, etc. The first layer 225a and the second layer 225b may be made of the same material. Alternatively, the first layer 225a and the second layer 225b may be made of different materials.

In the first layer 225a, the number of (200) planes is larger than that of (111) planes, and P2>P1 is satisfied. This structure can make the first layer 225a finer, thereby increasing the adhesion to the substrate 7. Because the first layer 225a is made finer, the adhesion between the substrate 7 and the second layer 225b can also be increased.

In the second layer 225b, the number of (111) planes is larger than that of (200) planes, and P1>P2 is satisfied. This structure causes the slip planes to dominate, thereby increasing the slipperiness of the second layer 225b. As a result, the slip planes are positioned in the surface layer of the protective layer 225, thereby increasing the abrasion resistance of the protective layer 225.

P2/P1 of the second layer 225b may be smaller than that of the first layer 225a. With this structure, the slipperiness of the protective layer 225 can be increased. In other words, the slip planes are formed in the surface layer coming into contact with the recording medium P, thereby increasing the abrasion resistance of the protective layer 225.

In the second layer 225b, the number of (200) planes may be larger than that of (111) planes, and P2>P1 may be satisfied. Also in this case, the finer layer is formed in the surface layer of the protective layer 225 coming into contact with the recording medium P, thereby increasing the abrasion resistance of the protective layer 225.

The crystal planes of the first layer 225a and the second layer 225b are measured by nanobeam electron diffraction.

The protective layer 225 may be formed by the following method, for example.

Let us assume a case where the protective layer 225 is formed by arc plasma ion plating, for example. In this case, the absolute value of a substrate bias voltage is set to 200 to 400 V to form the first layer 225a that satisfies P2>P1. Subsequently, the absolute value of the substrate bias voltage is increased to 500 V to form the second layer 225b. With this method, the protective layer 225 including the first layer 225a and the second layer 225b may be formed.

The protective layer 225 may be formed by making the deposition pressure in deposition of the first layer 225a higher than that in deposition of the second layer 225b. Alternatively, the protective layer 225 may be formed by making the temperature of the substrate in deposition of the first layer 225a higher than that in deposition of the second layer 225b.

The thermal head according to the present disclosure is not limited to embodiments, and various changes may be made without departing from the spirit of the disclosure. While a thin-film head including the heat generators 9 having a small width produced by forming a thin film of the electrical resistant layer 15 has been described as an example, the thermal head according to the present disclosure is not limited thereto. The thermal head may be a thick-film head including the heat generators 9 having a large width produced by patterning the various electrodes and then forming a thick film of the electrical resistant layer 15.

While a flat-surface head including the heat generators 9 on the first surface 7f of the substrate 7 has been described as an example, the thermal head according to the present disclosure may be an end-surface head including the heat generators 9 on the end surface of the substrate 7.

The heat generators 9 may be formed by forming the common electrode 17 and the individual electrodes 19 on the heat storage layer 13 and forming the electrical resistant layer 15 only in the region between the common electrode 17 and the individual electrodes 19.

The sealing member 12 may be made of the same material as that of the covering member 29 that covers the drive ICs 11. In this case, the covering member 29 and the sealing member 12 may be formed simultaneously by printing the sealing member 12 on the region where it is to be formed when printing the covering member 29.

While the connector 31 is directly connected to the substrate 7, a flexible printed circuits (FPC) may be connected to the substrate 7.

First Example

To examine the relation between the crystal planes of the crystal grains constituting the protective layer and the abrasion resistance of the protective layer, the following experiment was carried out.

A plurality of substrates were prepared as samples provided with the various electrode wires, such as the common electrode 17, the individual electrodes 19, the first connection electrodes 21, and the second connection electrodes 26. The protective layer 25 having a thickness of 5 μm was deposited using an arc plasma ion plating device. In deposition of the protective layer 25, the substrate bias voltages indicated in Table 1 were applied.

Thermal heads were produced by mounting the drive ICs 11 on the substrate 7 provided with the protective layer 25 and applying and curing the covering member 29. Three thermal heads were produced for each of sample No. 1 to 4. The produced thermal heads were each assembled in the housing together with the platen roller 50 to produce thermal printers. The following running test was carried out.

The abrasion resistance of the protective layer 25 was checked using one thermal head out of the three heads. The running test was carried out using thermal paper as the recording medium under the following conditions: conveyance speed of 300 mm/s, character printing period of 0.7 ms/Line, applied voltage of 0.3 W/dot, and pressing pressure of 10 kgF/head. If dot omission occurred in printing, it was determined that the protective layer 25 was damaged, and the distance of running until the dot omission was recorded as the running distance.

It was checked whether sticking occurred using the other two thermal heads. The thermal printers provided with the thermal heads of sample No. 1 to 4 printed characters by 1000 mm using thermal paper as the recording medium at conveyance speed of 300 mm/s with all the heat generating elements turned on. The thermal paper on which the characters were printed was checked. A sample neither of the two thermal heads of which had no character missing was represented by very good in Table 1. A sample one of the two thermal heads of which had character missing was represented by good in Table 1.

TABLE 1

| | Sample No. | | | |
|---|---|---|---|---|
| | 1 | 2 | 3 | 4 |
| Bias voltage (−V) | 100 | 200 | 300 | 400 |
| h (111) | 89.93 | 64.3 | 81.39 | 86.24 |
| h (200) | 323.1 | 305.1 | 185.8 | 117.3 |
| h (200)/h (111) | 3.59 | 4.74 | 2.28 | 1.36 |
| Running distance (km/μm) | 110 | 155 | 165 | 175 |
| Sticking | Good | Good | Very good | Very good |

It was found out that the running distances of the thermal printers provided with the thermal heads of sample No. 1 to 4 exceeded 110 km and that the abrasion resistance of the protective layer 25 was increased. It was also found out that the sticking was evaluated as very good or good and that the slipperiness of the protective layer 25 was increased.

In the thermal heads of sample No. 3 and 4 satisfying 3.59>P2/P1, sticking was evaluated as very good, that is, no sticking occurred.

Second Example

A plurality of substrates were prepared as samples provided with the various electrode wires, such as the common electrode 17, the individual electrodes 19, the first connection electrodes 21, and the second connection electrodes 26. In deposition of the protective layer 225, the first layer 225a and the second layer 225b were deposited using an arc plasma ion plating device by applying the substrate bias voltages indicated in Table 2. The thickness of the first layer 225a was 2.5 μm. The thickness of the second layer 225b was 2.5 μm.

The same running test as that in the first example was carried out to check the abrasion resistance of the protective layer 225. To check the adhesion of the protective layer 225, a sample in which the protective layer 225 had no peeling after the running test was represented by very good in Table 2. A sample in which the protective layer 225 had peeling was represented by good in Table 2.

TABLE 2

| | Sample No. | | | | | | | |
|---|---|---|---|---|---|---|---|---|
| | 5 | | 6 | | 7 | | 8 | |
| | First layer | Second layer | First layer | Second layer | First layer | Second layer | First layer | Second layer |
| Bias voltage (−V) | 0 | 0 | 100 | 100 | 300 | 500 | 300 | 300 |
| h(111) | 95.62 | 95.62 | 89.93 | 89.93 | 81.39 | 93.07 | 81.39 | 81.39 |
| h(200) | 250.1 | 250.1 | 323.1 | 323.1 | 185.8 | 71.76 | 185.8 | 185.8 |
| h(200)/h(111) | 2.62 | 2.62 | 3.59 | 3.59 | 2.28 | 0.77 | 2.28 | 2.28 |
| Running distance (km) | 100 | | 110 | | 200 | | 165 | |
| Adhesion | Good | | Good | | Very good | | Very good | |

It was found out that the running distances of the thermal printers provided with the thermal heads of sample No. 5 to 8 exceeded 100 km and that the abrasion resistance of the protective layer 225 was increased. It was also found out that the adhesion of the thermal heads was evaluated as very good or good and that the adhesion of the protective layer 225 was increased.

In the thermal head of sample No. 7, the first layer 225a satisfied P2>P1, and the second layer 225b satisfied P1>P2. It was found out that the running distance of the thermal head of sample No. 7 was 200 km or longer and that the abrasion resistance of the protective layer 225 was increased. It was also found out that the adhesion was evaluated as very good and that the adhesion of the protective layer 225 was increased.

In the thermal head of sample No. 7, P2/P1 of the second layer 225b was smaller than that of the first layer 225a. It was found out that the slipperiness of the protective layer 225 was increased and that the running distance was 200 km or longer.

It was found out that the adhesion of the thermal head of sample No. 8 was evaluated as very good and that the adhesion of the protective layer 225 was increased.

Third Example

A plurality of substrates were prepared as samples provided with the various electrode wires, such as the common electrode 17, the individual electrodes 19, the first connection electrodes 21, and the second connection electrodes 26. In deposition of the protective layer 225, the first layer 225a was deposited using an arc plasma ion plating device by applying a substrate bias voltage of 600 V. The second layer 225b was deposited by applying the substrate bias voltages indicated in Table 3. The thickness of the first layer 225a was 2.5 μm. The thickness of the second layer 225b was 2.5 μm.

The same running test as that in the first example was carried out to check the abrasion resistance of the protective layer 225. In addition, it was checked whether sticking occurred.

To check the adhesion, a scratch test was carried out using a scratch tester CSR-1000 manufactured by RHESCA including a diamond indenter having a radius R of 0.2 mm and an angle of 120°.

The substrate 7 was cut in the thickness direction of the substrate 7 to form a cross section of the protective layer 25, and the peak intensity of X-rays was measured. The X-ray intensity ratio in Table 3 indicates the X-ray intensity ratio of the entire protective layer 225.

TABLE 3

| | Sample No. | | | |
|---|---|---|---|---|
| | 9 Second layer | 10 Second layer | 11 Second layer | 12 Second layer |
| Bias voltage (−V) | 400 | 500 | 550 | 600 |
| h (111) | 120.10 | 121.73 | 141.32 | 123.10 |
| Half width of h (111) | 0.80 | 1.20 | 0.80 | 1.10 |
| h(200) | 410.68 | 363.76 | 325.08 | 374.49 |
| Half width of h (200) | 0.50 | 0.50 | 0.70 | 0.70 |
| h (200)/h (111) | 3.42 | 2.99 | 2.30 | 3.04 |
| Hardness (GPa) | 24 | 25 | 25 | 25 |
| Young's modulus (GPa) | 320 | 340 | 340 | 340 |
| Arithmetic surface roughness (μm) | 67.70 | 32.20 | 29.40 | 32.30 |
| Running distance (km) | 150 | 170 | 180 | 170 |
| Average grain size (nm) | 550 | 415 | 405 | 420 |
| Sticking | Very good | Very good | Very good | Very good |

It was found out that the running distance of the thermal printers provided with the thermal heads of sample No. 9 to 12 exceeded 150 km and that the abrasion resistance of the protective layer 225 was increased. In addition, it was found out that the sticking of all the thermal heads was evaluated as very good.

As the result of the scratch test, it was found out that the adhesion strength of the thermal heads of sample No. 9 to 12 was 2.5 kgf or higher and that the adhesion of the protective layer 225 was increased.

In the thermal heads of sample No. 9 to 12 satisfying P2/P1≤3.42, it was found out that the results of the running test exceeded 150 km and that the abrasion resistance of the protective layer 225 was increased.

In the thermal heads of sample No. 9 to 12 having a half width of the diffraction peak of the (200) plane of 0.5° to 0.7°, it was found out that the results of the running test exceeded 150 km and that the abrasion resistance of the protective layer 225 was increased.

In the thermal heads of sample No. 9 to 12 having a half width of the diffraction peak of the (111) plane of 0.8° to 1.2°, it was found out that the results of the running test exceeded 150 km and that the abrasion resistance of the protective layer 225 was increased.

In the thermal heads of sample No. 9 to 12 having hardness of the protective layer 225 of 24 GPa or higher, it was found out that the results of the running test exceeded 150 km and that the abrasion resistance of the protective layer 225 was increased.

In the thermal heads of sample No. 9 to 12 having a Young's modulus of the protective layer 225 of 320 GPa or higher, it was found out that the results of the running test exceeded 150 km and that the abrasion resistance of the protective layer 225 was increased.

In the thermal heads of sample No. 9 to 12 having arithmetic surface roughness Ra of the protective layer 225 of 67.7 nm or lower, it was found out that the results of the running test exceeded 150 km and that the abrasion resistance of the protective layer 225 was increased.

In particular, in the thermal heads of sample No. 10 to 12 having arithmetic surface roughness Ra of the protective layer 225 of 32.3 nm or lower, the results of the running test exceeded 170 km.

In the thermal heads of sample No. 9 to 12 having an average crystal grain size of the crystal grains constituting the protective layer 225 of 405 nm to 550 nm, it was found out that the results of the running test exceeded 150 km and that the abrasion resistance of the protective layer 225 was increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A thermal head comprising:
   a substrate;
   a heat generator positioned on the substrate;
   an electrode positioned on the substrate and connected to the heat generator; and
   a protective layer that covers the heat generator and part of the electrode;
   wherein
   the protective layer contains titanium and nitrogen, and
   the protective layer satisfies
   P2>P1
   where P1 is peak intensity of X-ray diffraction of a (111) plane, and P2 is peak intensity of X-ray diffraction of a (200) plane.

2. The thermal head according to claim 1, wherein 4.7≥(P2/P1) is satisfied.

3. The thermal head according to claim 1, wherein a half width of a diffraction peak of the (200) plane of the protective layer measured by X-ray diffraction falls within 0.5° to 1°.

4. The thermal head according to claim 1, wherein a half width of a diffraction peak of the (111) plane of the protective layer measured by X-ray diffraction falls within 0.8° to 1.2°.

5. The thermal head according to claim 1, wherein a hardness of the protective layer is 24 GPa or higher.

6. The thermal head according to claim 1, wherein Young's modulus of the protective layer is 320 GPa or higher.

7. The thermal head according to claim 1, wherein 67.7 nm≥Ra is satisfied where Ra is arithmetic surface roughness of a surface of the protective layer.

8. The thermal head according to claim 1, wherein crystal grains constituting the protective layer include a columnar grain that is long in a thickness direction of the substrate.

9. The thermal head according to claim 1, wherein an average crystal gain size of the crystal grains constituting the protective layer is 205 nm to 605 nm.

10. The thermal head according to claim 9, wherein standard deviation of the average crystal gain size is 16.7 nm to 60.8 nm.

11. The thermal head according to claim 1, wherein
   the protective layer includes a first layer and a second layer positioned on the first layer, and
   the first layer satisfies P2>P1.

12. The thermal head according to claim 11, wherein the second layer satisfies P1>P2.

13. The thermal head according to claim 11, wherein P2/P1 of the second layer is smaller than P2/P1 of the first layer.

14. A thermal printer comprising:
the thermal head according to claim 1;
a conveyance mechanism configured to covey a recording medium such that the recording medium passes over the heat generator; and
a platen roller configured to press the recording medium against the heat generator.

\* \* \* \* \*